United States Patent
Morioka (10) Patent No.: US 6,677,955 B1
(45) Date of Patent: Jan. 13, 2004

(54) IMAGE PROCESSING METHOD AND IMAGE PROCESSING APPARATUS

(75) Inventor: Seisuke Morioka, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/493,190

(22) Filed: Jan. 28, 2000

(30) Foreign Application Priority Data

Mar. 4, 1999 (JP) ............................................ 11-057087

(51) Int. Cl.[7] .................. G06T 11/40; G06F 15/00; G06F 9/30; G06F 9/40; G06F 7/38; G06F 9/00; G06F 9/44; G06F 3/00; G06F 3/02; G06F 3/023

(52) U.S. Cl. ........................ 345/552; 712/217; 712/225; 712/226; 712/231; 712/244; 709/102; 709/106; 709/107; 710/59; 710/17; 710/18; 345/582

(58) Field of Search ................................. 345/539, 582, 345/473, 419, 441, 428, 629, 537, 540, 552; 717/125; 712/239, 217, 225, 226, 231, 244; 709/102, 106, 107; 710/59, 17, 18

(56) References Cited

U.S. PATENT DOCUMENTS 6,075,543 A * 6/2000 Akeley ....................... 345/582

6,201,547 B1 * 3/2001 Rogers et al. ............... 345/539

FOREIGN PATENT DOCUMENTS

| EP | 0507548 A2 * | 7/1992 | ........... G06F/15/72 |
|----|--------------|--------|----------------------|
| EP | 0 507 548 A2 | 10/1992 | |
| EP | 0981 107 A1 | 2/2000 | |

* cited by examiner

Primary Examiner—Kee M. Tung
Assistant Examiner—Dalip K Singh
(74) Attorney, Agent, or Firm—Dickstein Shapiro Morin & Oshinsky, LLP (57) ABSTRACT

The present invention is characterized by first performing the necessary rendering in the frame period, then during the remaining time of that frame period, rewriting the texture data in the texture buffer memory. The image rendering process for each frame is performed first, then after the rendering process has been completed for the frame, if there is remaining time, that time is used to rewrite the texture data. Therefore, the rendering process is not interrupted, the displayed image is not interrupted or frozen, and it is possible to rewrite the texture data in the small-capacity texture buffer memory and make it possible to use virtually a lot of texture data to render one scene.

10 Claims, 7 Drawing Sheets

Rendering Process and Texture Update Process during Frame Period

Rendering Process and Texture Update Process during Frame Period

FIG. 5

IMAGE PROCESSING METHOD AND IMAGE PROCESSING APPARATUS

BACKGROUND OF THE INVENTION

1. Field of the Invention

The present invention relates to an image processing method and image processing apparatus to be used in game machines or simulation machines, and in more particular, to an image processing method and image processing apparatus that updates the texture data without any loss in image rendering performance.

2. Description of the Related Art

Game machines and simulation machines execute a game program or simulation program in response to control input from the operator, and display an image that corresponds to the progression of the game or the like. Moreover, these kinds of machines are equipped with image processing apparatus for performing image rendering.

This kind of image processing apparatus employs 3-D computer graphic technology to calculate the movement position or amount of movement of a model created using multiple polygons and to render a polygon at the desired position. When doing this, texture data, which is the polygon pattern, is used. Typically, graphic processors which perform rendering use a frame buffer memory wherein the rendered image data is written, and a texture buffer memory which stores texture data. Moreover, the amount of movement of the model is found by executing a game program or the like, and after the position of the polygon is calculated according to that amount, the graphic processor uses the texture data stored in the texture buffer memory to render a polygon, and then saves the rendered image data in frame buffer.

The rendering is performed within the time period of the frame, and the image generated according to the image data that are stored in the frame buffer is displayed on the display. It is necessary that the rendering process be performed in a short time and it is also desired that access of the texture buffer be performed at high speed. Moreover, static RAM (SRAM) is used as the semiconductor memory that makes high-speed access possible, however the cost per bit of this kind of semiconductor memory is very high when compared with DRAM.

On the other hand, in order to make the displayed image appear more realistic, it is desired that more texture data be used. However, since it is also desired that access be performed at high speed and that cost be reduced, it is not possible to increase the capacity of the texture buffer memory. Therefore, conventionally, the necessary texture data were stored in a large-capacity external memory (mask ROM or hard disk) that was separate from the texture buffer memory and whose access speed was slow. A period of no display was established during the period that the scene changed, and during this period, part or all of the texture data in the texture buffer memory was rewritten with the texture data in the external memory, making it possible to use a lot of texture data.

However, with the conventional method, during the period when the texture data is being rewritten, the rendering process for generating the image is interrupted, and this period becomes a period when there is no image display between scenes, or a period when the image becomes frozen. Moreover, in a racing game where the player races on a course that covers a long distance, or in a role-playing game where the character moves through a long course, it is not possible to rewrite the texture data, and the amount of texture data that can be used is limited.

SUMMARY OF THE INVENTION

Therefore, in view of the above problem in the prior art, it is an objective of the present invention to provide an image processing method and image processing apparatus that is capable of updating texture data without interrupting the rendering process.

Furthermore, another objective of the present invention is to provide an image processing method and image processing apparatus that is capable of updating texture data without affecting the performance of the rendering process.

To accomplish these objectives, the present invention is characterized by first performing the necessary rendering in the frame period, then during the remaining time of that frame period, rewriting the texture data in the texture buffer memory. The image rendering process for each frame is performed first, then after the rendering process has been completed for the frame, if there is remaining time, that time is used to rewrite the texture data. Therefore, the rendering process is not interrupted, the displayed image is not interrupted or frozen, and it is possible to rewrite the texture data in the small-capacity texture buffer memory and make it possible to use virtually a lot of texture data to render one scene.

In a preferred embodiment, the necessary rendering process is performed first in each frame period. When the rendering process is finished, the remaining time is used to rewrite the texture data. If the rendering process ends quickly, it is possible to rewrite texture data for that much longer a time period, and if the rendering process requires a long time, the time period for rewriting the texture data becomes shorter. In addition, if the entire frame period is used for performing the rendering process, texture data is not rewritten during that frame period. Normally, the necessary texture data is rewritten over several frame periods.

In order to accomplish the objective above, the present invention is characterized by an image processing method for performing a rendering process by reading a predetermined texture data from a texture buffer memory and generating image data, the method comprising:

a step of performing the rendering process first during the frame period;

and a step of rewriting the texture data in the texture buffer memory during the remaining time of the frame period after the rendering process has been completed.

In addition, in order to accomplish the objectives, the present invention is characterized by an image processing apparatus, having a graphics processor that performs a rendering process by reads a predetermined texture data from the texture buffer memory and generating image data, comprising:

a data memory that stores texture data; and a texture data updating unit which reads the texture data in the data memory and updates the texture data stored in the texture buffer memory into the read texture data; and wherein the graphics processor performs the rendering process first during the frame period, and then the texture data update unit updates the texture data during the remaining time in the frame period after the rendering process has been completed.

Moreover, in the above invention, the apparatus further comprises a work memory in which the rendering process data are stored, and a bus that connects the graphics processor, the texture data update unit, the data memory and the work memory; and wherein the graphics processor reads the rendering process data from the work memory via the bus during the rendering process; and wherein the texture data update unit reads the texture data in the data memory via the bus during the update process.

Furthermore, in the above invention, during the frame period, the graphics processor supplies a rendering start signal to the texture data update unit at the beginning of the rendering process and then supplies a rendering end signal when the rendering process is completed;

the texture update unit starts the texture data update process in response to the rendering end signal, and stops the texture data update process in response to the rendering start signal.

DETAILED DESCRIPTION OF THE PREFERRED EMBODIMENT

The preferred embodiment of the present invention will be explained in reference to the drawings. However, the embodiment is not limited to the technical range of the present invention.

Figure 1:
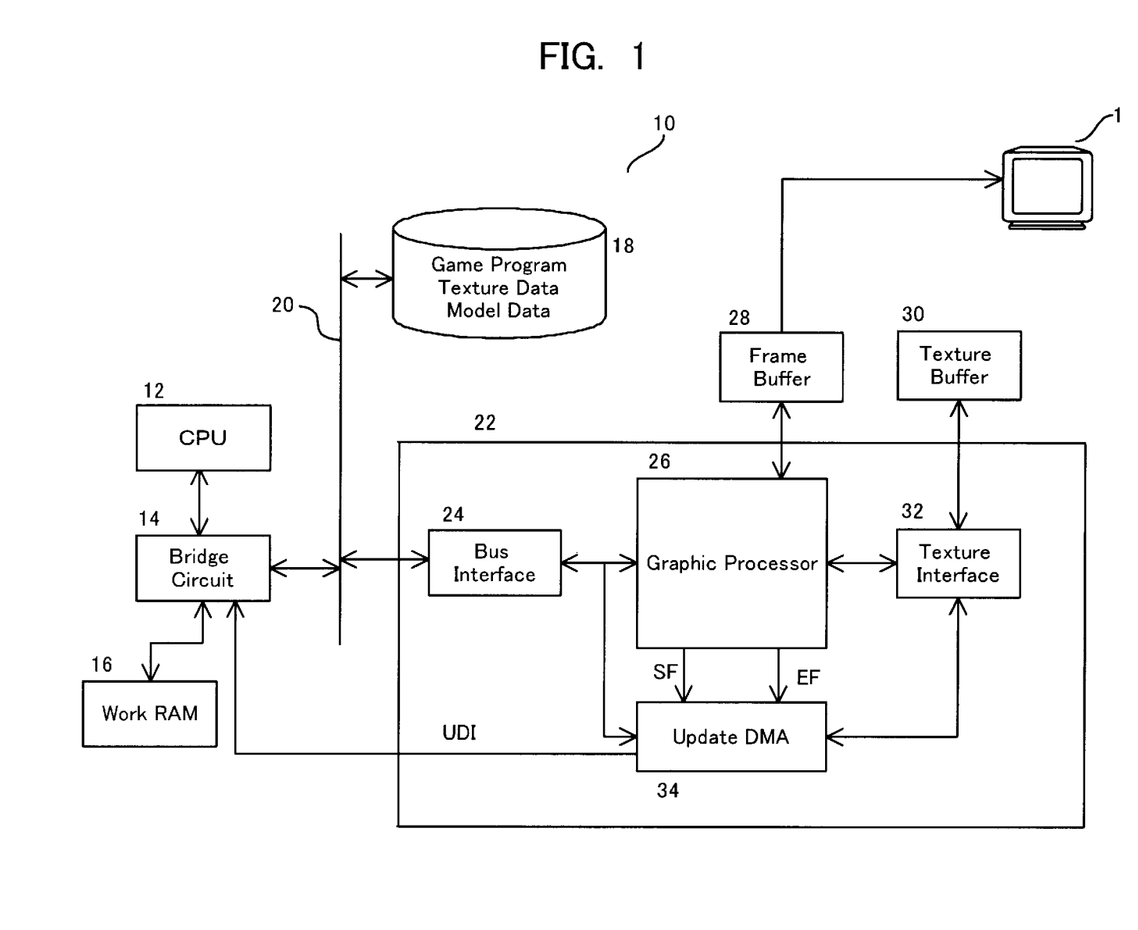
FIG. 1 is a configuration diagram of the image processing apparatus used in this embodiment.

FIG. 1 is a configuration diagram of the image processing apparatus according to the embodiment. The components shown in FIG. 1, except for the display means 1, make up the image processing apparatus 10. The image processing apparatus 10 comprises a CPU 12 for performing execution of the game processor, work RAM 16 that is installed for the various processes performed by the CPU 12, a bridge circuit 14 for connecting the CPU 12 and work RAM 16, data memory 18 in which the game program, texture data and model data are stored, and an image processing unit which performs the rendering process and texture data update process. These are all connected, for example, on one board by a bus 20 such as a PCI bus.

The image processing unit 22 is constructed with, for example, an Application Specific Integrated Circuit (ASIC), and comprises a bus interface 24, graphics processor 26 for performing the rendering process, Dynamic Memory Access (DMA) (texture data update unit) 34 for updating the texture data, and a texture interface 32. In addition, the image processing apparatus 10 comprises a frame buffer memory for storing image data that are generated in the rendering process, and a texture buffer memory 30 for temporarily storing texture data that are needed for the rendering process. The frame buffer memory 28 is constructed with, for example, video RAM, and it is capable of storing at least one frame of image data. The texture buffer 30 is constructed with high-speed access SRAM, and the part of the texture data that are stored in the data memory 18 and which are needed for the rendering process are written in the texture buffer 30 by way of the texture interface 32. In order that the texture buffer 30 be capable of high-speed access, its capacity is relatively small, and at least it is smaller that the capacity of the texture data in the data memory 18.

The data memory 18, it an external memory connected by the PCI bus 21, and is a relatively large-capacity memory that is constructed with, for example, a mask ROM or hard disk, and it is connected to the CPU or graphics processor 26 and update DMA 34 in the image processing unit by way of the PCI bus 20. The bridge circuit 14 is a device for use as an interface with the CPU 12 and other devices, and the PCI bus 20 connects to the CPU 12 by way of this bridge circuit 14. Also, the bus interface 24 is a circuit for connecting the graphics processor 26 or update DMA 34 in the image processing unit 22 to the bus 20.

Figure 2:
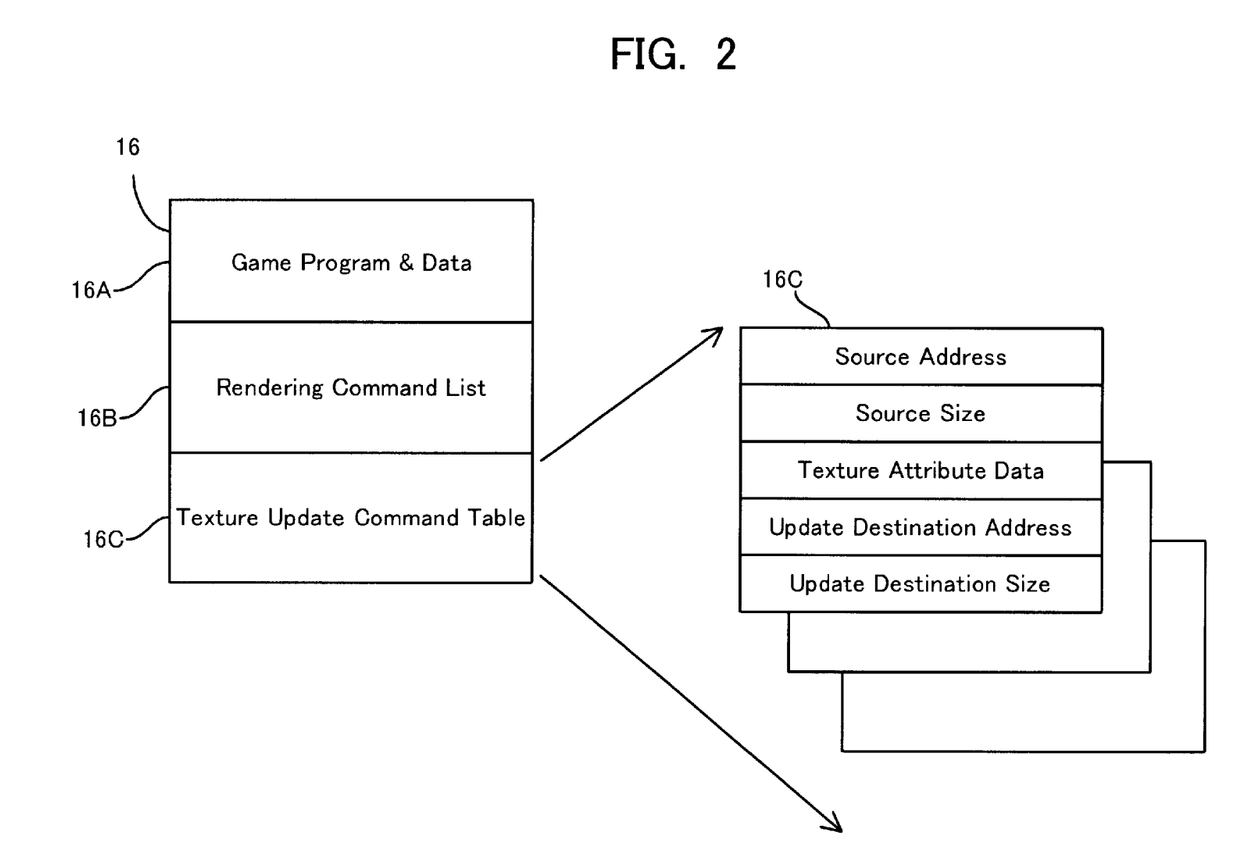
FIG. 2 shows the data which is stored in the work RAM 16.

FIG. 2 shows the data stored in the work RAM 16. The game program 16A, which is executed by the CPU 12, and the rendering command list (or rendering process data) 16B for generating the image, are stored in the work RAM 16. The CPU 12 executes the game program 12 and advances through the game in correspondence to control input from the operator. As the game proceeds, the CPU 12 generates a rendering command list 16B and stores it in the work RAM 16. In addition, when a rendering command is sent from the CPU 12 to the graphics processor 26, the graphics processor 26 reads the rendering command list 16B, which is stored in the work RAM 16, by way of the bridge circuit 14, bus 20 and bus interface 24, performs rendering and generates image data, and then stores that data in the frame buffer memory 28. The graphics processor 26 reads the texture data in the texture buffer 30 during the rendering process.

Furthermore, as the game proceeds, the CPU 12 generates a texture update command table (or texture data update data), which is a list of texture data update commands, and stores it in the work RAM 16. Also, during the texture update period, the update DMA 34, which is the texture data updating unit, reads the texture data command table 16C in the work RAM 16 by way of the bridge circuit 14, bus 20 and bus interface 24, and according to the address in the data memory 18 and data size (source address, source size) which are included in the texture update command table 16C, it writes the read out texture data to the update destination address of the texture buffer 30 which is included in the update command table 16C. The texture data update command table 16C also contains data such as a texture attribute data to be updated and an update destination size. Writing to the texture buffer 30 is performed by way of the texture interface 32. After the texture data update process has been completed, the update DMA supplies an update complete interrupt signal UDI to the CPU 12 by way of the bridge circuit 14. The data inside the texture data update command table 16C may also be stored beforehand in the data memory 18 and read from there.

As described above, in the image processing apparatus 10 shown in FIG. 1, when the graphics processor 26 performs the rendering process, data is read from the work RAM 16 by way of the bridge circuit 14, bus 20 and bus interface, and also similarly, when the update DMA 34 performs the texture data update process, data is read from the work RAM 16 by way of the bridge circuit 14, bus 20 and bus interface 24, and data is also read from the data memory 18 by way of the bus 20 and bus interface 24. Therefore, if both processes are performed simultaneously, there is a problem of conflict in the bus 20, and causes a decrease in performance of the rendering process by the graphics processor 26. Therefore, in this embodiment, the rendering process is performed first during the frame period, and after the rendering process has been completed, the time remaining in the frame period is used to perform the texture data update process.

Figure 3:
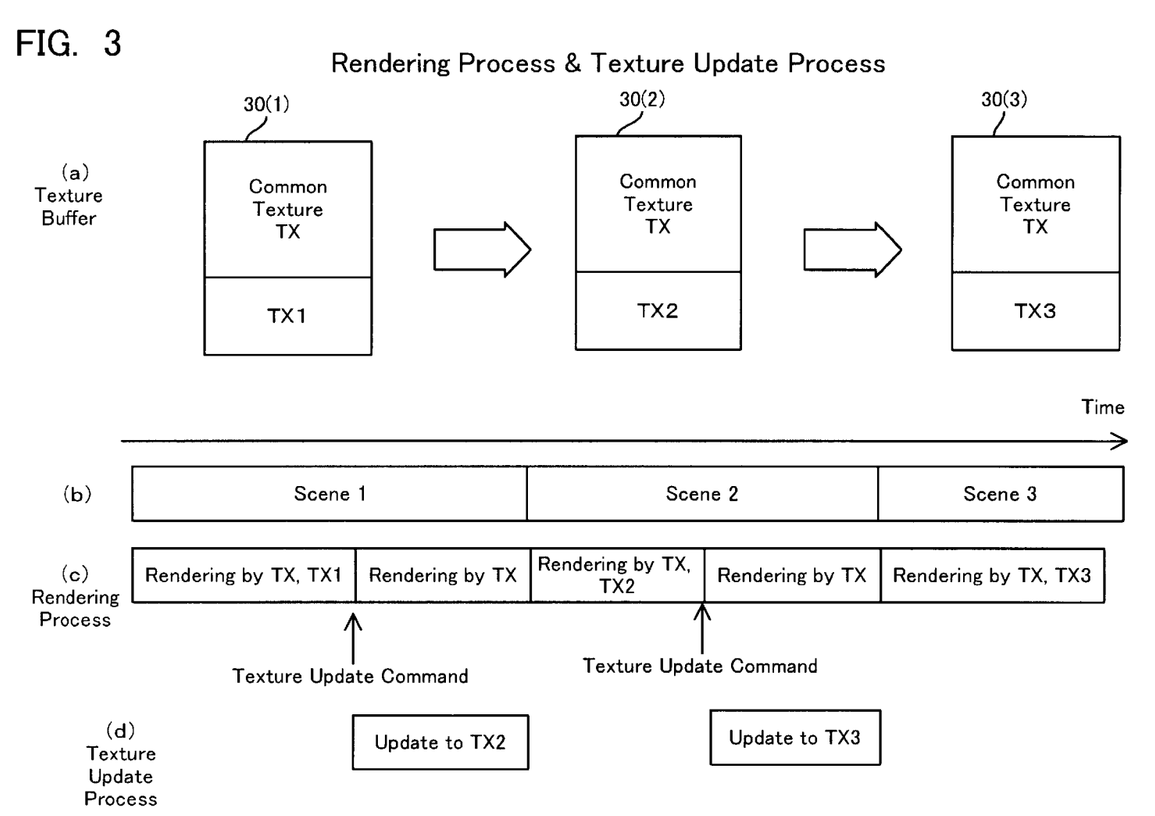
FIG. 3 is a diagram which shows the relationships of the texture buffer, rendering process and texture update process.

FIG. 3 shows the relationships between the texture buffer, rendering process and texture data update process. This is one example of this relationship and a different example will be described later. In the example shown in FIG. 3, the horizontal line represents time, and (a) shows the change in the data in the texture buffer, (b) shows how the displayed scene changes, (c) shows the change in the rendering process and (d) shows the texture data update process.

In the example shown in FIG. 3, during scene 1, common texture data TX that is used by scene 1 to 3, as well as texture data TX1 used by scene 1 are stored in the texture buffer 30. In addition, the graphics processor 26 accesses the texture buffer 30 and performs the rendering process according to the rendering command list 16B. During that time, the first half of scene 1 uses the common texture data TX and the texture data TX1 for scene 1 in the texture buffer 30 and performs the rendering process (see (c)). The CPU 12 executes the game program, and sends a texture update command to the update DMA 34 with timing such that the shortest time until the next scene 2 is the same as the time required for updating the texture data TX1 to texture data TX2 for scene 2.

In response to the texture update command, the update DMA 34 uses the time remaining in the frame period after the rendering process has been completed to exchange in sequence the texture data TX1 in the texture buffer 30 with the update texture data TX2. As described above, during this texture update process, the update DMA reads the texture data from the data memory 18 according the command list of the texture update command table 16C in the work RAM 16, and writes that data in a specified address in the texture buffer 30. Moreover, during this process to update to this texture data TX2, the graphics processor 26 uses the common texture data TX to perform rendering.

Finally, after the texture data has been completely updated to this texture data TX2 in part of the texture buffer 30, the update DMA 34 sends an update complete interrupt signal UDI to the CPU 12. The CPU 12 then moves to scene 2 and the graphics processor 26 uses the common texture data TX and data TX2 for scene 2 in the texture buffer 30 to perform the rendering process. Similarly, as described above, when moving from scene 2 to scene 3, in response to a texture update command from the CPU 12, the update DMA 34 updates the texture data TX2 to new texture data TX3.

Figure 4:
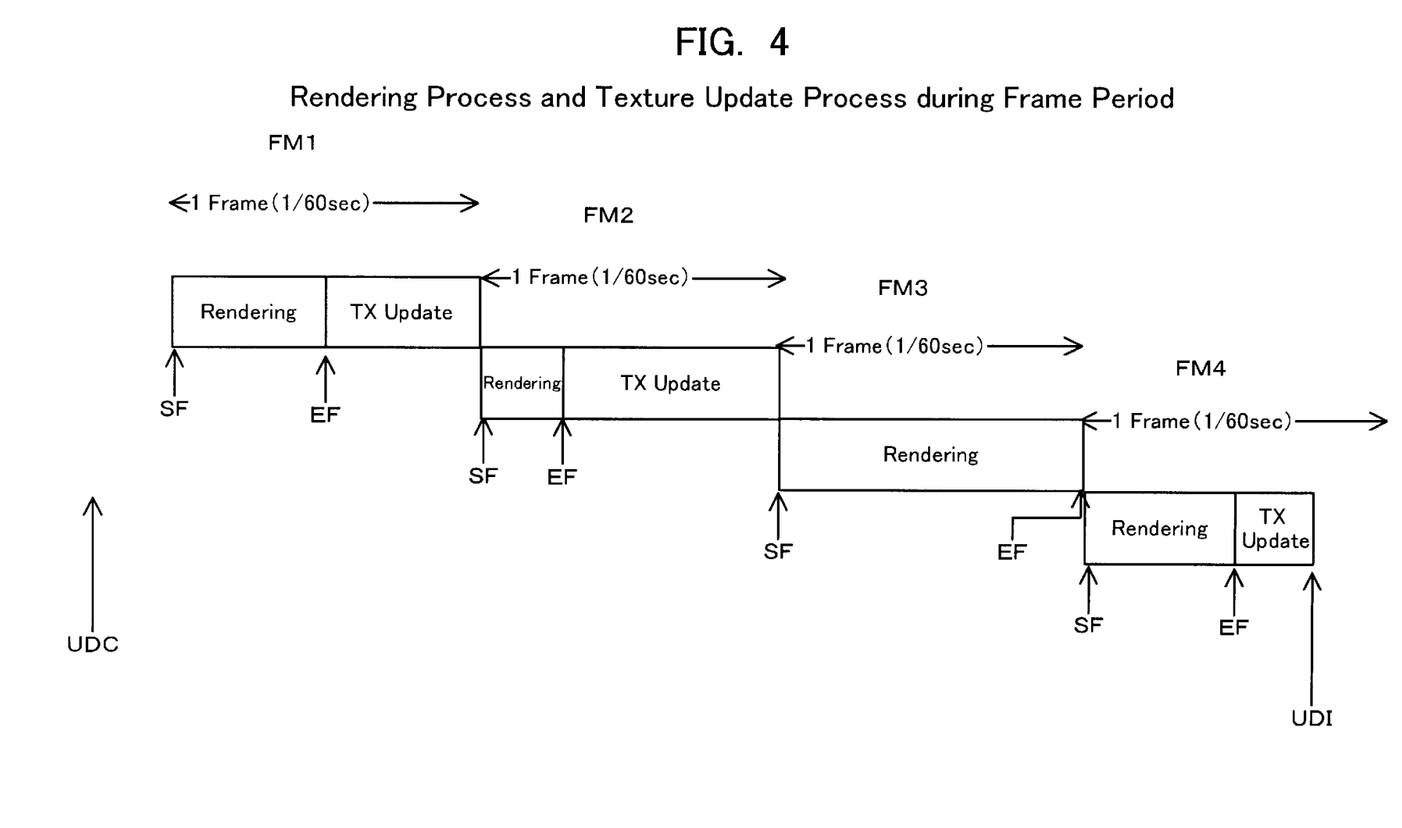
FIG. 4 is a diagram which shows the rendering process and texture data update process in the frame period.

FIG. 4 is a drawing which shows the rendering process and texture data update process during the frame period. The frame periods FM1 to FM4 shown in FIG. 4 are the frame periods during which the rendering process and texture update process are performed simultaneously after the texture update command has been sent, as described in FIG. 3.

At the beginning of the frame period, the rendering process is performed first by the graphics processor 26. In the rendering process, the graphics processor 26 reads the rendering command list 16B from the work RAM 16, and according to it, uses the texture data in the texture buffer 30 to perform the specified rendering, then stores the generated image data in the frame buffer 28. In the frame period FM1, after the rendering process that is to be performed during that frame period has been completed, the remaining time is used by the texture update unit, in which the update DMA 34 reads texture data from the data memory 18 according to the texture update command list 16C in the work RAM 16, and writes the read texture data to the texture buffer 30 by way of the texture interface 32.

Finally, when there is no more time remaining in the frame period FM1 and the next frame period FM2 begins, the update DMA 34 temporarily suspends the texture update process. In the next frame period FM2 as well, the rendering process is performed first by the graphics processor 26. In the frame process FM2, as shown in the figure, the rendering process is completed in a short time, and the texture update process continues in the relatively long remaining time of that frame period FM2.

In the example shown in FIG. 4, in frame period FM3 the rendering process is performed by the graphics processor 26 during the entire frame period FM3. No time can be maintained for the texture data update process. In addition, in the example shown in FIG. 4, in the time remaining during the frame period FM4 after the rendering process has been completed, the texture update process is started again, and before this frame period FM4 ends, all of the required texture data is updated, then the update DMA 34 sends an update complete interrupt signal to the CPU 12 by way of the bridge circuit 14.

As shown in FIG. 4, the texture data update process is performed during the time remaining in each frame period after the rendering process has completed. Moreover, the rendering process by the graphics processor 26 is performed first and there is no drop in its performance. As can be seen in FIG. 4, the time remaining in the frame period after the rendering process has been completed changes dynamically. When a long time is required for the rendering process, the remaining time becomes short, and if the rendering process is short, the remaining time will increase by that amount. In addition, it is not shown in FIG. 4, however, in a frame period that does not require rendering processing, that entire frame is used for updating the texture data.

During the frame period, the rendering process and the texture data update process are performed in time division manner, however, in order to make that possible, the graphics processor 26 sends a start flag SF to the update DMA 34 to notify it that the rendering process has started, and it sends an end flag EF to notify when the rendering process has finished. The update DMA 34 performs the texture data update process in response to the end flag EF, and suspends the texture data update process in response to the start flag SF. With this method, processing control by the CPU 12 in not needed, and it is possible to reduce the processing load of the program.

The vertical blanking period in display means 1 is included in the frame periods of FIG. 4. The texture data update process may also be performed during the vertical blanking period.

Figure 5:
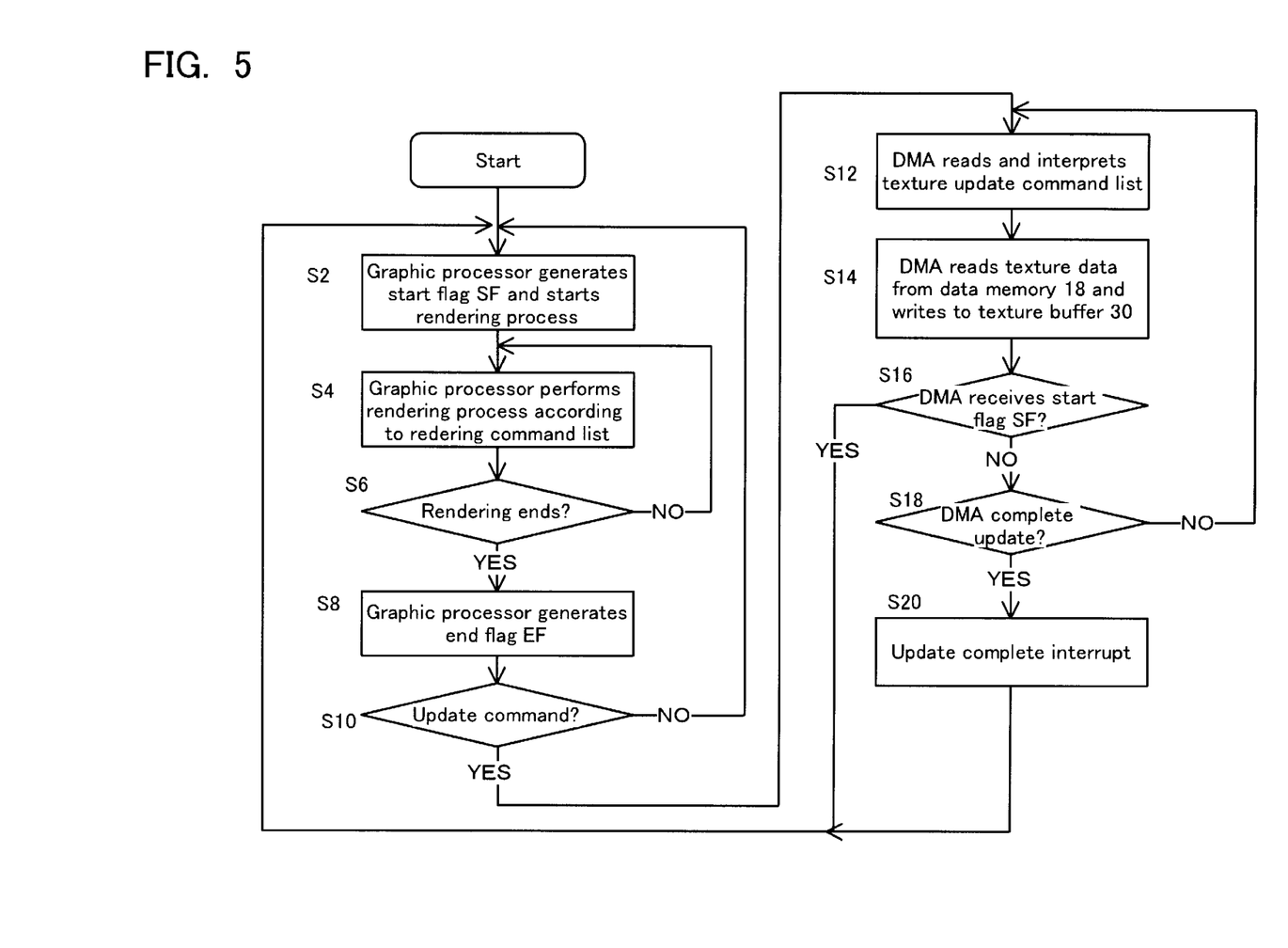
FIG. 5 is a flowchart of the operation of the graphics processor and update DMA.

FIG. 5 is a flowchart which shows the operation of the graphics processor and update DMA. FIG. 5 shows the operation from the start to the end of the frame period. The operation is described in detail in reference to FIG. 1, FIG. 3 and FIG. 4.

At the start of the frame period the graphics processor 26 sends a start flag SF to the update DMA 34 and starts the rendering process (S2). The graphics processor 26 reads from the work RAM 16 the rendering command list which was generated by the CPU 12, interprets it, and performs the rendering process (S4). During the rendering process, the position of the polygon on the display screen, for example, is calculated, and hidden-surface processing is performed. Also, during the rendering process, texture data is read from the texture buffer 30 by way of the texture data interface 32, an image pattern based on the texture data is assigned for the polygon and the image data is generated. The generated image data is then written in the frame buffer 28. This rendering step S4 is repeated until the rendering command ends.

When rendering, which is to be performed during the frame period, is completed (S6), the graphics processor sends an end flag EF to the update DMA 34 (S8). If a texture update command has already been issued from the CPU 12, the texture data update process is performed, however, if no command has been issued, the rendering process for the next frame period is performed in the same way.

If a texture update command has been issued, the update DMA 34 reads (or is given) the texture update command table, which has been generated by the CPU 12, from the work RAM 16 by way of the bus 20 and bus interface 24 and interprets it. Moreover, in accordance to this update command, the update DMA 34 reads in sequence texture data from an address in the data memory 18 that has specified by the update command, and then writes that data to a specified address in the texture buffer 30 (S14). This update process is repeated until the next frame period starts and a start flag SF is received from the graphics processor 26.

When a start flag SF is received (S16), the update DMA 34 immediately suspends the texture update process. The rendering process is performed first in the next frame period as well according to process steps S2 to S8. Then when that rendering process ends, the update DMA 34 restarts the suspended texture update process in response to the end flag EF. Moreover, as in the case of frame period FM4 in FIG. 4, when the update process ends (S18), the update DMA 34 sends an update complete interrupt signal UDI to the CPU 12 by way of the bridge circuit 14 to notify it that the texture update has been completed.

Figure 6:
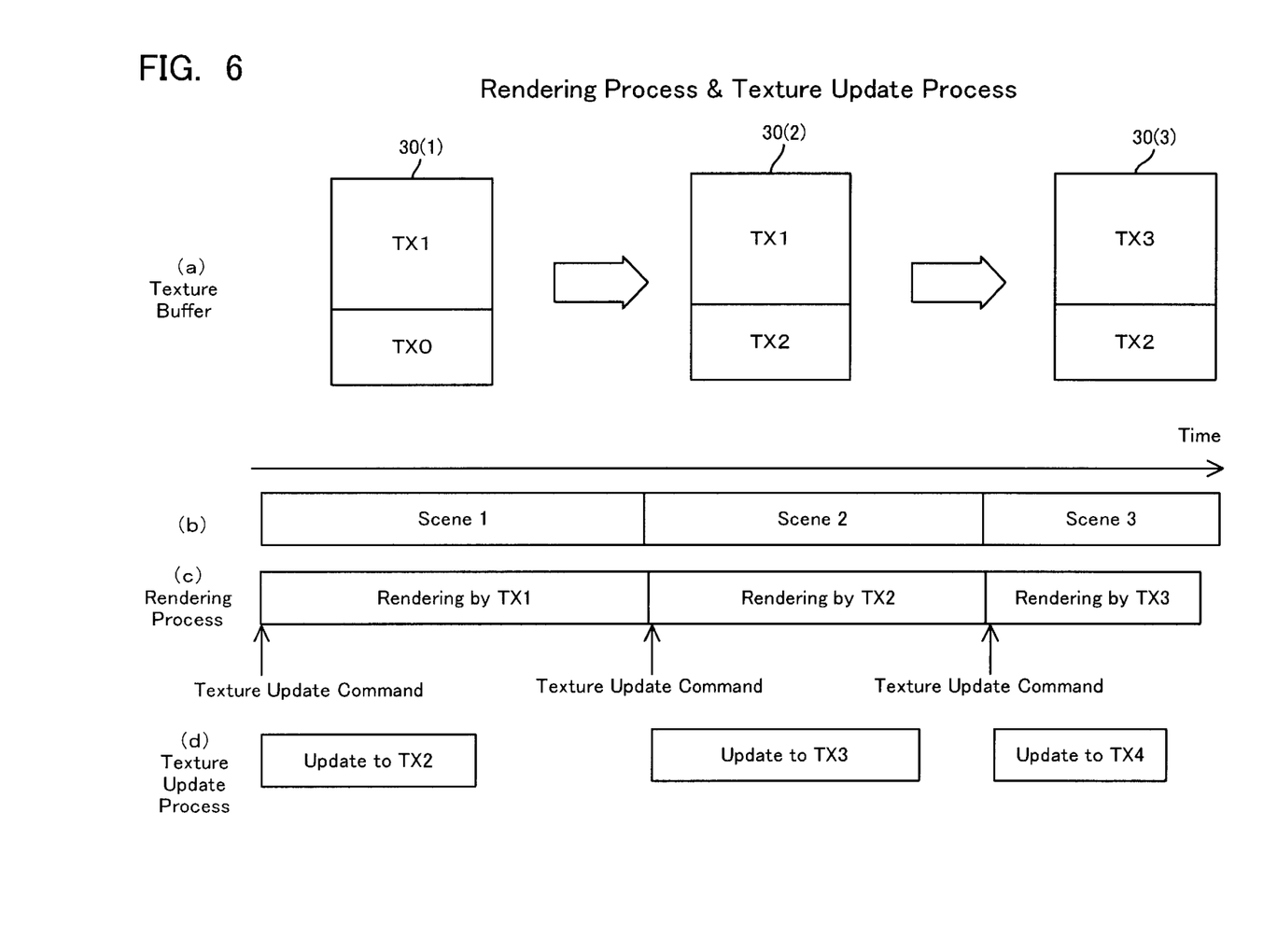
FIG. 6 is a diagram which shows the relationships of the texture buffer, rendering process and texture update process.

FIG. 6 shows the relationships between the texture buffer, rendering process and texture update process. This example is a second example, which differs from the first example. In the example shown in FIG. 6, the texture buffer 30 is divided into two areas, and as the scenes change from scene 1 to scene 2 to scene 3, the texture data TX1, TX2, TX3 that are used by the respective scenes are updated during the scene previous to that scene. At the start of scene 1, the texture data TX1 for scene 1 and the texture data for the previous scene TX0 are held in the texture buffer 30 (1).

As scene 1 starts, the CPU 12 issues a texture update command. During each frame period from the start of scene 1, the necessary rendering processing is performed first, after which, the texture update process is performed in the remaining time. In the rendering process (c), the texture data TX1 in the texture buffer 30 (1) is used. During this time, texture data TX0 is updated to updated with the texture data TX2 for the next scene 2. At the start of scene 2, the texture buffer 30 (2) contains the texture data TX1 for scene 1 and the texture data TX2 for scene 2.

When scene 1 ends, the texture data TX1 is no longer needed, and the process to update it to the texture data TX3 for scene 3 begins at the same time that scene 2 begins. At the start of scene 3, the texture buffer 30 (3) stores the texture data TX2 for scene 2 and the texture data TX3 for scene 3. Similarly, the process to update the data to texture data TX4 for scene 4 begins.

As shown in FIG. 4, the texture data update process and the rendering process are performed according to the rule that the rendering process is performed first.

Figure 7:
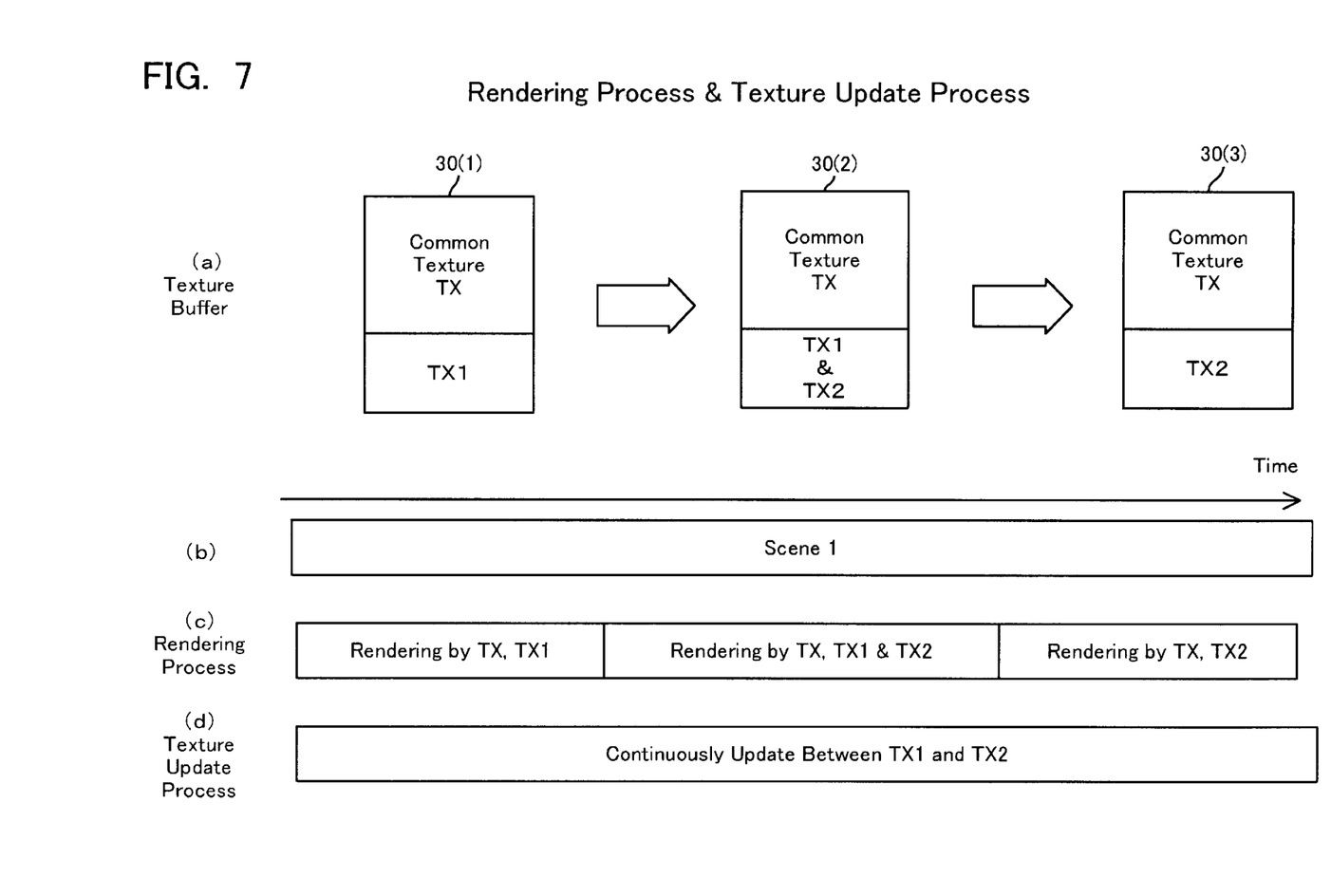
FIG. 7 is a diagram which shows the relationships of the texture buffer, rendering process and texture update process.

FIG. 7 further shows the relationships between the texture buffer, rendering process and texture update process. This example is a third example. In the example of FIG. 7, the scene does not change, however, it is applied to a case such as in a soccer game or a fighting game, for example, where the patterns for the spectator seats are changed one by one, and the texture data TX1 and TX2, which correspond to the patterns for the spectator seats, are updated alternately. It is desirable that the patterns for the spectator seats change at random with no connection to the advancement of the game.

At the start of scene 1, the texture buffer 30 (1) contains common texture data TX as well as texture data TX1 that changes. The rendering process is performed using this common texture data and texture data TX1. As scene 1 begins, the texture data TX1 is updated to TX2. During scene 1, the texture buffer 30 (2) contains common texture data TX as well as a combination of texture data TX1 and TX2. During this period, the rendering process uses the common texture data TX and texture buffer TX1 and TX2. In the above example, the spectator seats are rendered by using the texture buffer TX1 and TX2.

In the end, the texture buffer 30 (3) stores the common texture data and only texture data TX2. In this state, the rendering process assigns a pattern for the spectator seats according to texture data TX2.

In this case as well, as shown in FIG. 4, the rendering process and continuously performed texture update process are performed according to the rule that the rendering process is performed first during the frame period. Moreover, in the case shown in FIG. 7, there is no particular need for a texture update command to be sent from the CPU 12, and likewise, there is no need for a texture update complete interrupt signal to be send from the update DMA 34.

This embodiment can also be applied in the same manner to image processing apparatus in a simulation apparatus.

In the present invention, since the rendering process is performed first during the frame period and then the texture update process is performed in the remaining time, it is possible to update the texture data with no drop in performance of the rendering process.

What is claimed is:

1. An image processing method for performing a rendering process by reading a predetermined texture data from a texture buffer memory and generating image data, for each frame, wherein a plurality of frame periods are repeated, the method comprising the steps of:

in a first frame period, during which there is a time remaining in the first frame period after the rendering process is completed, performing the rendering process first during the first frame period;

rewriting the texture data in the texture buffer memory during the remaining time of said first frame period after said rendering process has been completed; and in a second frame period, during which there is no time remaining in the second frame period after the rendering process is completed, performing the rendering process during the second frame period, wherein no rewriting of the texture data in the texture buffer memory occurs in the second frame period.

2. An image processing method as defined in claim 1, wherein, in the step of the rendering process, the rendered image data is written to a frame buffer memory and an image is displayed for each frame according to the image data written in the frame buffer memory.

3. An image processing method as defined in claim 1, wherein said texture data is not rewritten if there is no time remaining in any frame period after the rendering process for said any frame period has been completed.

4. An image processing apparatus, having a graphics processor which performs a rendering process by reading a predetermined texture data from a texture buffer memory and generating image data for each frame, wherein a plurality of frame periods are repeated, comprising a data memory that stores texture data; and a texture data updating unit which reads the texture data in the data memory and updates the texture data stored in the texture buffer memory into the read texture data; and wherein the graphics processor performs the rendering process first during each of the plurality of frame periods, and then the texture data update unit updates the texture data during the remaining time in a first frame period after the rendering process for the first frame period has been completed and does not update the texture data in a second frame period during which there is no time remaining in said second frame period after the rendering process for the second frame period has been completed.

5. An image processing apparatus as defined in claim 4, further comprising:

a work memory where rendering data are written; and a bus for connecting said graphics processor, said texture data update unit, said data memory and said work memory;

wherein said graphics processor reads said rendering data from said work memory by way of said bus during said rendering process, and said texture data update unit reads the texture data from said data memory by way of said bus during said update process.

6. An image processing apparatus as defined in claim 4 or 5, wherein said graphics processor accesses said texture buffer memory during said rendering process, and said texture data update unit accesses said texture buffer memory during said update process.

7. An image processing apparatus as defined in claim 5, wherein texture data updated data is stored in said work memory or said data memory, and said texture data update unit reads the texture data update data from said work memory or said data memory by way of said bus during said update process.

8. An image processing apparatus as defined in claim 4, wherein during the frame period said graphics processor supplies a rendering start signal to said texture data update unit at the start of the rendering process, and supplies a rendering end signal at the end of the rendering process, and said texture data update unit starts said texture data update process in response to said rendering end signal, and suspends said texture data update process in response to said rendering start signal.

9. An image processing method, for performing a rendering process by reading a predetermined texture data from a texture buffer memory, which is constantly being overwritten, and generating image data for each frame, wherein a plurality of frame periods are repeated, the method comprising the steps of:

detecting an end timing of said rendering process for a first frame period during which there is a time remaining in the first frame period after the rendering process is completed;

starting a process to overwrite said texture buffer memory if there is texture data to be overwritten at the detected end timing of said rendering process for the first frame period;

detecting the start timing of said rendering process for a subsequent frame period; and suspending the process of overwriting of said texture buffer memory at the start timing of said rendering process for the subsequent frame period, wherein in a second frame period during which there is no time remaining in the second frame period after the rendering process is completed, no process to overwrite said texture buffer memory is performed.

10. An image processing method, for performing a rendering process by reading a predetermined texture data from a texture buffer memory, which is constantly being overwritten, and generating image data, the method comprising the steps of:

detecting an end timing of said rendering process;

starting a process to overwrite said texture buffer memory if there is texture data to be overwritten at the detected end timing of said rendering process;

detecting the start timing of said rendering process;

suspending the process of overwriting of said texture buffer memory at the start timing of said rendering process; and repeating said detecting an end of timing step through said suspending step.

* * * * *